United States Patent
Haber et al.

(10) Patent No.: US 10,140,160 B2
(45) Date of Patent: *Nov. 27, 2018

(54) DYNAMIC RECOMMENDATION FRAMEWORK FOR INFORMATION TECHNOLOGY MANAGEMENT

(71) Applicant: International Business Machines Corporation, Armonk, NY (US)

(72) Inventors: Eben M. Haber, Cupertino, CA (US); Tara L. Matthews, San Jose, CA (US); Chung-Hao Tan, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/081,452

(22) Filed: Mar. 25, 2016

(65) Prior Publication Data

US 2016/0246651 A1   Aug. 25, 2016

Related U.S. Application Data

(63) Continuation of application No. 12/556,629, filed on Sep. 10, 2009, now Pat. No. 9,323,639.

(51) Int. Cl.
    *H04L 12/24* (2006.01)
    *G06F 11/34* (2006.01)
    *G06F 9/50* (2006.01)
    *G06F 19/00* (2018.01)

(52) U.S. Cl.
    CPC ........ *G06F 9/5027* (2013.01); *G06F 11/3409* (2013.01); *H04L 41/14* (2013.01); *G06F 19/00* (2013.01); *G06F 2201/885* (2013.01); *G06F 2209/503* (2013.01)

(58) Field of Classification Search
    CPC .............................. H04L 41/14; H04L 41/22
    See application file for complete search history.

(56) References Cited

U.S. PATENT DOCUMENTS

| | | |
|---|---|---|
| 7,020,147 B1 | 3/2006 | Amadon et al. |
| 7,870,117 B1 | 1/2011 | Rennison |
| 2002/0019869 A1 | 2/2002 | Goldszmidt et al. |
| 2002/0072956 A1 | 6/2002 | Willems et al. |
| 2003/0014290 A1 | 1/2003 | McLean et al. |

(Continued)

OTHER PUBLICATIONS

Cooper et al., Information Processing Model of Information Technology Adaptation: An Intra-Organizational Diffusion Perspective, The Data Base for Advances in Information Systems, Winter 2005, vol. 36, No. 1.

(Continued)

*Primary Examiner* — Tom Y Chang
(74) *Attorney, Agent, or Firm* — Lieberman & Brandsdorfer, LLC

(57) ABSTRACT

Embodiments are provided for managing performance of a computer system. Both implicit and explicit recommendations for processing of tasks are provided. System performance is tracked and evaluation based upon the actions associated with the task. Future recommendations of the same or other tasks are provided based upon implicit feedback pertaining to system performance, and explicit feedback solicited from a system administrator.

18 Claims, 4 Drawing Sheets

(56) References Cited

U.S. PATENT DOCUMENTS

| | | |
|---|---|---|
| 2005/0086239 A1 | 4/2005 | Swann et al. |
| 2005/0096948 A1 | 5/2005 | Chen et al. |
| 2005/0144151 A1 | 6/2005 | Fischman et al. |
| 2005/0278202 A1* | 12/2005 | Broomhall ............. G06Q 10/06 705/7.26 |
| 2006/0153090 A1 | 7/2006 | Bishop et al. |
| 2007/0101165 A1 | 5/2007 | Kenyon et al. |
| 2008/0092122 A1 | 4/2008 | Caprihan et al. |
| 2008/0208478 A1* | 8/2008 | Ella ....................... G06Q 10/06 702/11 |
| 2008/0288432 A1 | 11/2008 | Malik et al. |
| 2010/0094788 A1 | 4/2010 | Schafer et al. |
| 2010/0192195 A1 | 7/2010 | Dunagan et al. |
| 2010/0333167 A1 | 12/2010 | Luo et al. |

OTHER PUBLICATIONS

Sjoberg et al., The Future of Empirical Methods in Software Engineering Research, Future of Software Engineering 2007.

\* cited by examiner

DYNAMIC RECOMMENDATION FRAMEWORK FOR INFORMATION TECHNOLOGY MANAGEMENT

CROSS-REFERENCE TO RELATED APPLICATION(S)

This application is a continuation patent application of U.S. patent application Ser. No. 12/556,629, filed Sep. 10, 2009, titled "Dynamic Recommendation Framework for Information Technology Management", now pending, the entire contents of which is hereby incorporated by reference.

BACKGROUND OF THE INVENTION

Technical Field

This invention relates to improving performance management of a distributed computer system. More specifically, the invention relates to a feedback loop that invokes human knowledge for improving task recommendations for system management.

Description of the Prior Art

Information technology, hereinafter referred to as IT, concerns the aspect of managing and processing information. More specifically, IT addresses development, installation, and implementation of computer systems and related applications. IT systems support collection of information. As technology evolves and systems grow, IT systems grow in complexity, which leads to an increased challenge for management. A system administrator is a person employed to operate a computer system and network, such as an IT system. The duties of a system administrator are wide-ranging and vary among organizations. In general, a system administrator is charged with installing, supporting, and maintaining servers, and planning for and responding to problems that arise in the system. Accordingly, a system administrator is responsible for ensuring that the IT system is running as efficiently as possible.

Systems management is the general area of IT that concerns configuring and managing computer resources, including network resources. In one embodiment, systems management includes data collection, monitoring, reporting configuration and analysis. For example, in a data center environment, system management may include inventory tracking and reporting, resource monitoring and provisioning, event and fault management, and configuration management. Tools are employed by administrators to orchestrate management of different components in the system and to increase productivity associated therewith. Some existing tools provide one or more recommendations to the administrator pertaining to tasks for improving system performance, including recommending changes to configuration settings. However, the existing tools fall short of addressing the entire system when making recommendations. In other words, existing tools make recommendations by evaluating a single component in the system without considering impact on other system components or the system as a whole. Additionally, existing tools do not make recommendations based upon feedback, either implicit or explicit, from an administrator.

Therefore, there is a need for a tool for management of an IT system that overcomes the limitations of the prior art. The tool will evolve at the same speed as the growth and complexity of the IT system, and will employ feedback from both the administrator and the information system. Accordingly, the tool will evaluate the system in its entirety, as well as the components that comprise the system.

SUMMARY OF THE INVENTION

This invention comprises a self-evolving recommendation framework for management of a distributed computer system by both implicit and explicit system administrator response tracking.

In one aspect of the invention, a method is provided for managing system performance. At least one task is dynamically recommended to a system administrator for management of at least one system component. The recommendation is based on a predicted outcome. A response is provided to the recommended task, and the impact of the recommended task on system parameters is tracked. Feedback from the impact of the recommended task is solicited. The feedback is then applied to a future task recommended to the system administrator.

In another aspect of the invention, a computer system is provided with a processor in communication with memory. An analysis manager is provided in the system to analyze system performance and to communicate with a recommendation manager for recommendation of at least one task to improve system performance. The recommendation manager is provided in communication with an interface to recommend at least one task for a system administrator for management of at least one system component. In one embodiment, the recommendation is based upon a predicted outcome. A response to the recommended task is provided, and the analysis manager tracks impact of the recommended task on system parameters and solicits feedback from impact of the recommended task. The solicited feedback is communicated to the recommendation manager and applied to calculation for a future task recommendation.

In yet another aspect of the invention, an article is provided with a computer-readable carrier including computer program instructions configured to manage system performance. Instructions are provided to dynamically recommend at least one task for a system administrator for management of at least one system component. The recommendation is based upon a predicted outcome. Instructions are provided to respond to the recommended task. Similarly, instructions are provided to track impact of the recommended task on system parameters and to solicit feedback from impact of the recommended task. The feedback is employed for a future task recommendation.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
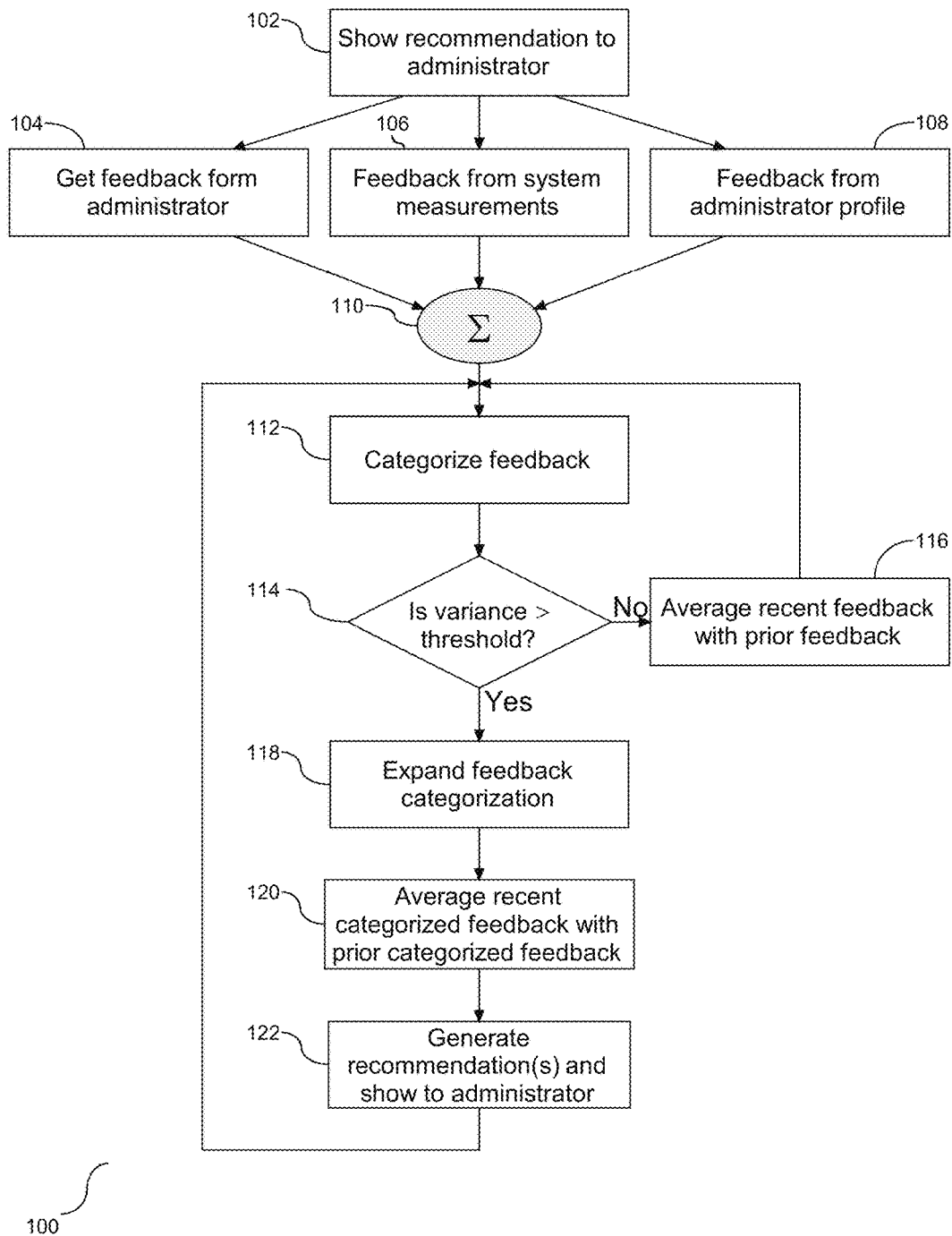
FIG. 1 is a flow chart illustrating a process for storing feedback data according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as an analysis manager and a recommendation manager. Both managers may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an analysis manager, a recommendation manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A manager is provided to recommend tasks to the system administrator for improving performance of a distributed computer system. The recommended tasks include, but are not limited to, a description, rationale pertaining to the usefulness and expected impact on the system, instructions for completing the task, a processing option, and input for the administrator to provide feedback about the usefulness of the recommendation. Feedback is generated based on the administrator's action regarding the recommended task and the impact of the administrator's action on the system. Future recommendations account for feedback received from processing of one or more prior tasks.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

Task recommendations are provided to the system administrator to suggest changes to bring about performance improvement, problem avoidance, problem determination, and recommended maintenance. Based upon the system administrator's action regarding the recommended task(s) and the task's impact on the system, a recommendation manager will adjust future recommendations. Data associated with a task is collected by the system to determine patterns, trends, abnormalities in usage, application access characteristics, etc. Future task recommendations are based upon implicit or explicit feedback from the administrator. Implicit feedback is based upon implicit actions of the administrator, including the administrator ignoring a recommendation, and executing a task associated with the recommendation, and other forms of indirect communication. Conversely, explicit feedback includes a direct communication from the administrator pertaining to the recommended tasks. A manager is employed to track the impact on system parameters of the implicit action(s) of the administrator and to determine if the intended result of the recommended tasks was achieved. Accordingly, a combination of implicit and explicit feedback is provided to the system administrator for future tasks recommendations.

FIG. 1 is a flow chart (100) illustrating a process for storing feedback data from an administrator. Initially one or more recommendations are provided and shown to a system administrator (102). Following the initial presentation, the system administrator will execute one or more of the recommended tasks, execute a task that was not presented, or not execute any tasks. In addition, the system administrator may manually enter a recommendation. Feedback is divided into two broad categories, explicit and implicit. Each of the actions listed above provided explicit feedback, implicit feedback, or a combination thereof. Explicit feedback is given by the system administrator. In one embodiment, explicit feedback may include approval of the task, disapproval of the task, a descriptive input, and a score. Implicit feedback is calculated by comparing the internal goal of the tasks with measured changes from system performance. Feedback for a task takes the form of a combination of implicit and explicit feedback. In one embodiment, a task may not have an immediate impact, such as cache allocation. For tasks that do not have an immediate impact, explicit feedback from the administrator has a strong influence.

As shown in the figure, feedback may be obtained from the administrator (104), from system measurements (106), and/or based on the role of the tasks for the administrator (108). In one embodiment, feedback from the administrator (104) is a form of nuanced feedback, wherein such feedback includes a subtle expression from the administrator. Prior examples of recommendation systems support simple queries and associated rudimentary responses. In contrast, nuanced feedback, as supported herein, permits the recipient to provide details about why to follow the recommendation, or not. The nuanced feedback allows the system to make better recommendations in the future. In one embodiment, nuanced feedback from the administrator may include comments pertaining to trends and associated outcomes, including but not limited to, discomfort of a predicted outcome, a proposal for a different change, etc. For example, one embodiment for managing storage capacity might issue the following recommendation: "Disk Utilization is increasing, and will lead to a full disk by next week. If you let the system allocate 10 GB more space, the disk won't fill up until 3 months from now." The recipient could provide a variety of nuanced responses to the recommendation. Examples of the nuanced feedback may include, but are not limited to, "I don't think the disk will fill up because the trend of increasing disk usage is temporary," "I agree that the disk will fill up, but instead I want to change a configuration parameter to reduce log sizes and thus disk utilization," "I agree that the disk will fill up, but instead I want to allocate 20 GB more space to give more time until the next problem," "I agree, go ahead," or "I don't have time to deal with this now." Each of these is examples of nuanced feedback response. As shown herein, the nuanced feedback provides a gradation with respect to the feedback, with each level of the gradation potentially leading to different recommendations in the future. Accordingly, the nuanced feedback supports granular input from the administrator.

The combination of all of the feedback gathered is accumulated (110). Following step (110), the gathered feedback is categorized (112). Details of the feedback categorization are described in detail with respect to FIG. 2. It is then determined if the standard deviation of the recently categorized feedback is greater than the expected feedback (114). If the response to the determination at step (114) is negative, then the recently categorized feedback is averaged with the prior categorized feedback (116), followed by a return to step (112) to anticipate receipt of the next set of feedback data. However, if the response to the determination at step (114) is positive, then the categories provided for in the feedback categorization are expanded (118) to provide further definition to the elements of the system, and the recently categorized feedback is averaged with the prior categorized feedback (120). Following step (120) one or more task recommendations are generated and presented to the system administrator (122), followed by a return to step (112) in anticipation of receipt of the next set of feedback data. Accordingly, as shown herein feedback data is received from multiple sources and is evaluated based upon past data and current data prior to generating one or more recommendations to the system administrator.

Figure 2:
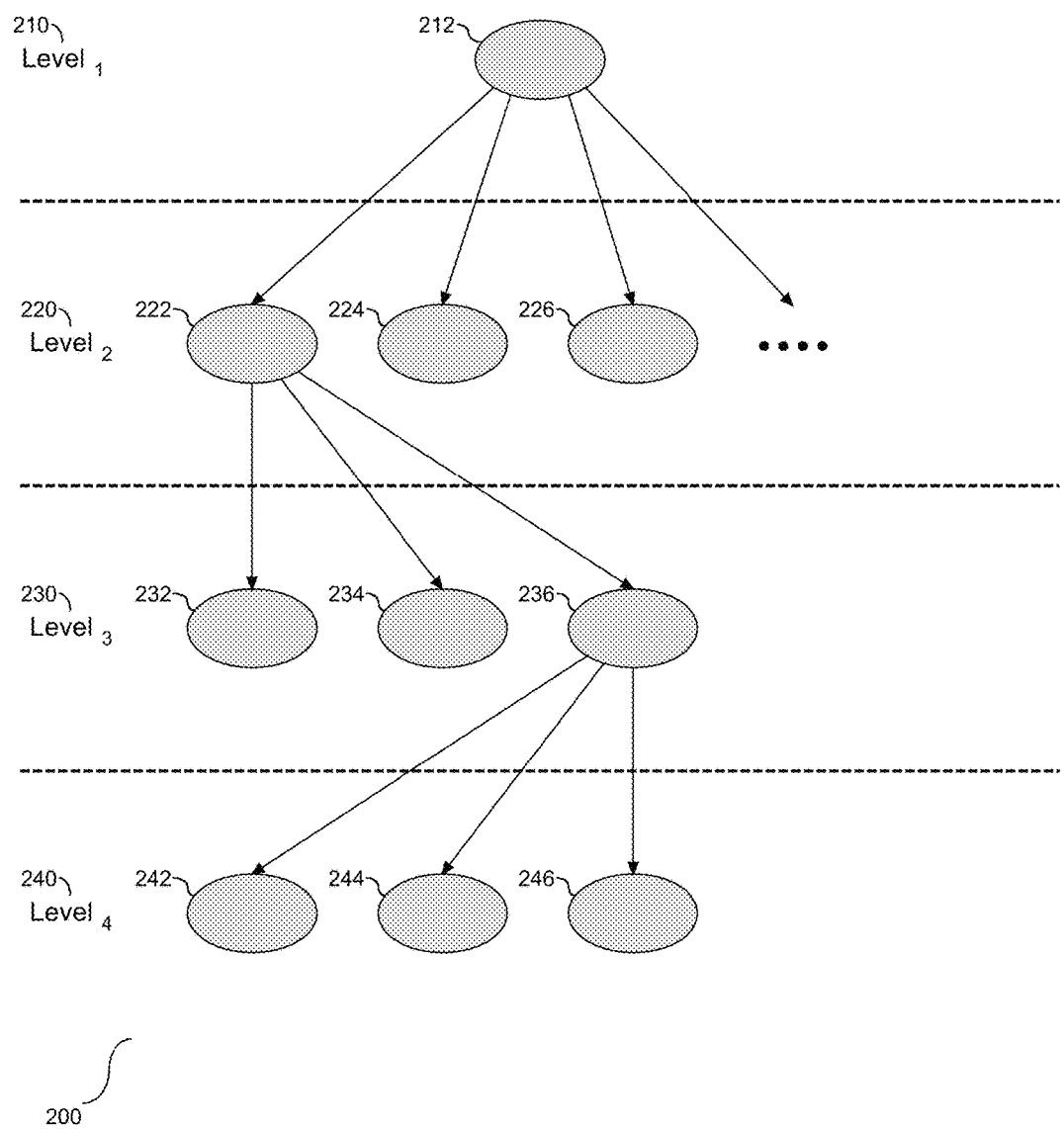
FIG. 2 is a block diagram of a classification tree.

As described with respect to FIG. 1 above, feedback data is evaluated and categorized. FIG. 2 is a block diagram (200) of an internal representation of a depth classification tree employed to granularly evaluate feedback data. As shown, the tree is divided into four levels. The first level (210) has a single node (212) and it pertains to general recommendations. The second level (220) pertains to recommendations associated with a task category. The third level (230) pertains to recommendation associated with an operation. The fourth level (240) pertains to recommendations associated with a component. In the example shown, there are three sub-categories in each of the levels, with each category represented as a node. However, the invention should not be limited to the quantity of levels in the tree or the quantity of categories in each level. The quantity of levels and categories illustrated herein are merely an example of an implementation of the tree. The second level (220) is shown with three nodes (222), (224), and (226), with each node representative of a task category. In one embodiment, node (222) is representative of software and firmware upgrades, node (224) is representative of proactive analysis, and node (226) is representative of task specific optimizations. The third level (230) is shown with three nodes (232), (234), and (236) with each node representative of an operation relative to a software or firmware upgrade type. In one embodiment, node (232) is representative of out-of-band operations, node (234) is representative of in-band operations with a restart, and node (236) is representative of in-band operations without a restart. The fourth level (240) is shown with three nodes (242), (244), and (246), with each node representative of a task recommendation for a component associated with an in-bound without restart operation. The component may be in the form of a hardware or software component, including but not limited to, a network appliance, firmware, storage volumes, etc. In one embodiment, node (242) is representative of storage volumes, node (244) is representative of storage pools, and node (246) is representative of one or more servers. Accordingly, the levels in the tree illustrate general categories of task recommendations, with granularity shown within the nodes of the tree.

As logic progresses through the levels of the tree, the recommendations are defined on a granular level. However, recommendations provided by the system are based on prediction of an outcome, a time range for the prediction, and the cost for implementing the recommendation. An outcome may come in the form of fixing or preventing a problem, improving performance, reducing risk, etc. The system administrator may have information otherwise not available to the system relating to the relative seriousness of different problems, tolerance for risk and cost, and one or more external factors that may influence the recommended task. As shown in FIG. 1, feedback is cumulative and may include feedback input received form the system administrator. For each recommendation provided by the feedback system, the system administrator may be provided with a selection of recommendations, including the following options: ignore the recommendation, show the system administrator how to perform the action, automatically perform the action at this specific time, and automatically perform this action whenever similar circumstances arise. Similarly, the manual feedback option provided at step (104) enables the system administrator to input a variety of feedback.

Figure 3:
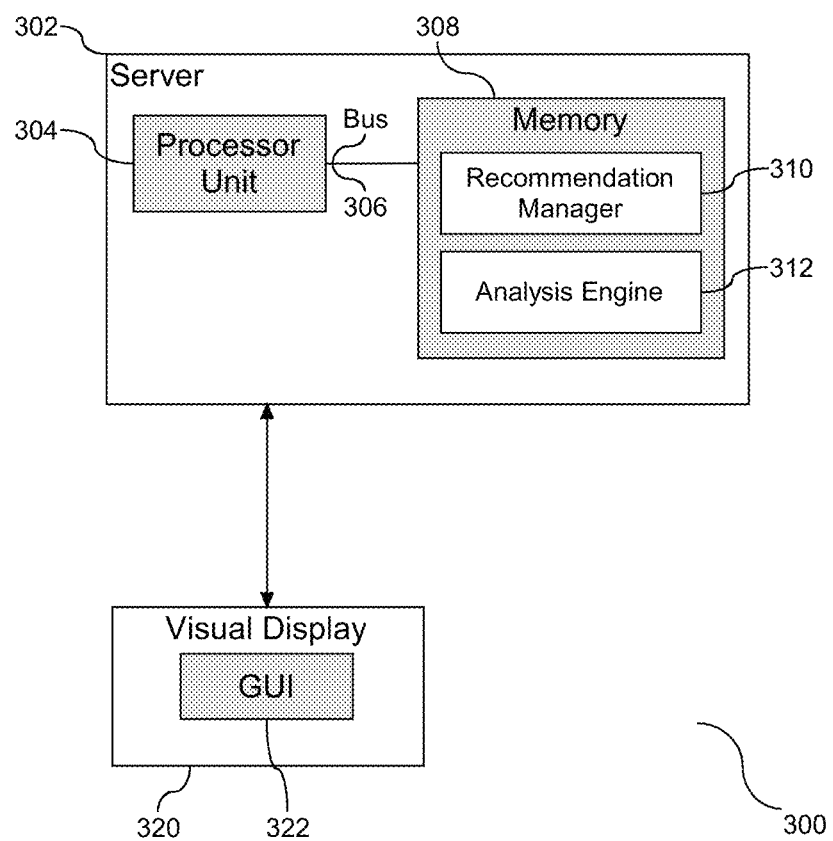
FIG. 3 is a block diagram of a computer system with embedded feedback tools.

Tasks that are selected by the system administrator may then be evaluated to improve the predictive model and to enable the system to learn how to improve its future task recommendations. In one embodiment, the recommended task includes the following: a description, rationale for the usefulness of the tasks and its predicted impact on the system, instructions for completion of the task, an option for automatic processing of the task, and input options for providing feedback about the usefulness of the recommendation. An analysis manager is provided to adjust future recommendations based upon impact of the currently execute tasks and feedback. FIG. 3 is a block diagram (300) of a computer system illustrating the recommendation manager embedded in communication with an analysis manager. As shown, a server (302) is provided in communication with a visual display (320). The server includes a processing unit (304) in communication with memory (308) across a bus (306). The visual display (320) is in communication with the server (302) and is shown with a graphical user interface (322). A recommendation manager (310) is shown local to the server (302). In one embodiment, the recommendation manager is a software manager that resides in memory (308). However, the invention should not be limited to a software manager. In one embodiment, the recommendation manager may be in the form of a hardware tool that resides external to the memory (308). An analysis manager (312) is provided in communication with the recommendation manager (310). The analysis manager (312) monitors the system parameters and provides data to the recommendation manager (310). One or more recommendations are communicated to the system administrator via the recommendation manager (310) and are presented on the visual display (320). In addition to receiving task recommendations, the system administrator may input data to the analysis manager (312) via the graphical user interface (322).

The analysis manager (312) continuously monitors the system state and periodically provides recommendations on how to improve the state of the system. Each recommendation communicated from the analysis manager (312) to the system administrator may include one or more of the following: a set of instructions to fulfill the recommendation, a predicted outcome if the instructions are followed, a predicted outcome if the instructions are not followed, the state of the system upon which the prediction is based, a confidence level, and a time frame for completion of the recommendation. In one embodiment, the data communicated to the system administrator may be on the graphical user interface of the visual display. Similarly, in one embodiment, the recommendations may also be displayed in the form of a sorted list, in a dialog box, and as an overlay of system components showing icons recommended actions and their associated priorities.

As explained herein, feedback comes in many forms, including solicited and unsolicited feedback from the system administrator. The recommendation manager (310) considers multiple sources of feedback about past recommendations as a source for improving future recommendations, including input from the system administrator, also known as input feedback. Such input includes the following: explicit value of a recommendation, implicit value of a recommendation, user profile, state of the system prior to the recommendation, and impact on the system responsive to executing the recommendation(s). Explicit value of a recommendation is direct feedback from the system administrator indicating the value of the recommendation prior to processing. There are different forms of explicit feedback, including but not limited to disagreement with the recommendation for various reasons, an indication of risk association with the recommendation, and suggestion of an alternate solution. Implicit value of a recommendation is created when the user decides to do a task recommended by the recommendation manager (310). The user profile pertains to the role and responsibility of the system administrator for managing the system. The state of the system prior to the recommendation provides an understanding of how the system state led to user action or adverse system performance. The state of the system prior to the issued task recommendation(s) provides an understanding of what states led to recommend an action or to adverse system performance. Finally, every task processed or not processed will have some impact on the system. The recommendation manager (310) adjusts future recommendations based upon system performance pertaining to processing or non-processing of a recommended task.

Figure 4:
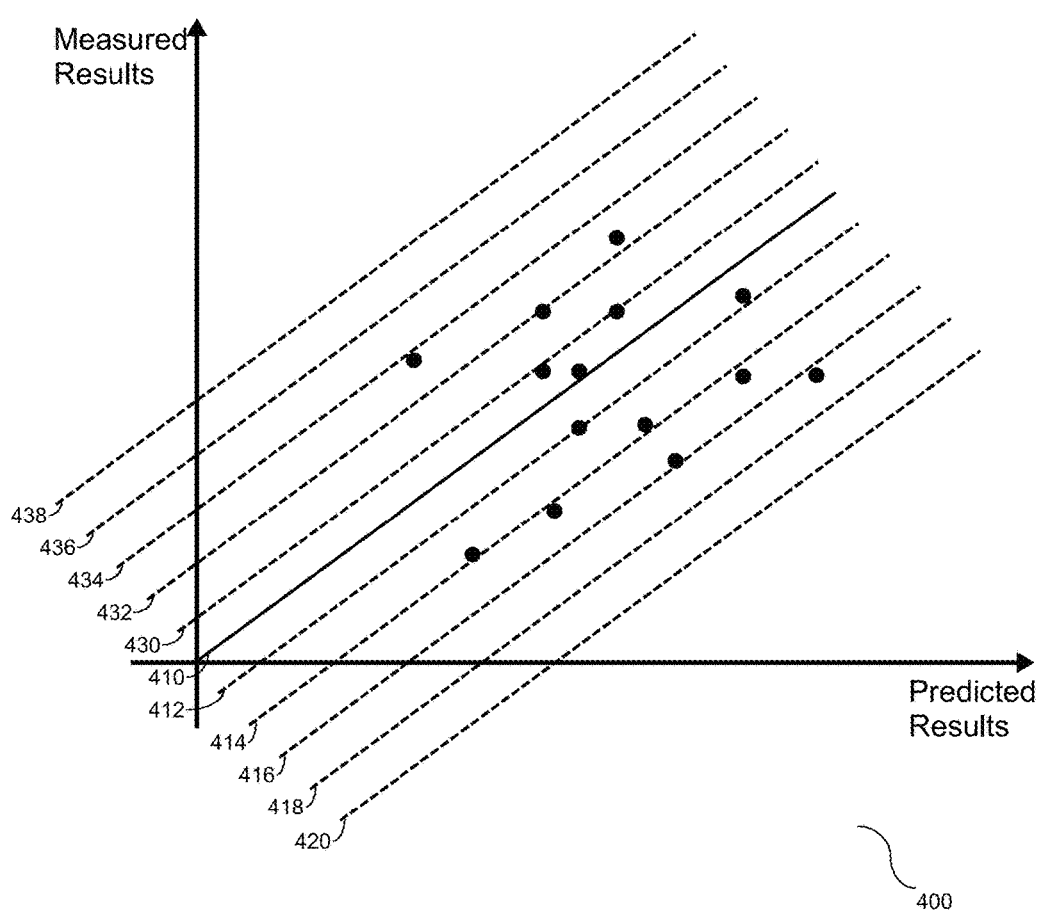
FIG. 4 is a graph illustrating a task reward system.

In one embodiment, a numerical value is placed on system performance pertaining to processing of a task. As noted above, the system may recommend a task or a series of tasks based upon current performance and past actions. A numerical value may be assigned to the action of a task based upon its impact on the system. FIG. 4 is a graph (400) illustrating an example of assignment of numerical values in a reward based system. As shown, one axis represents predicted results, and one axis represents measured results. A contoured penalty and reward function is provided based on the distance between the expected outcome and the measured outcome associated with a recommended task. All tasks that measure along the curve (410) receive an award of points. In one embodiment, tasks that measure on the curve (410) receive a maximum allotment of points. Tasks that fall below the curve (410) and within a range of one or more of the contours represent under-performance of the system in response to actions associated with the recommendation(s). A numerical value less than the expected return at (410) is assigned to the processed task. In this example, there are five contours (412), (414), (416), (418), and (420) that fall below the curve (410). As the distance of one of the contours (412)-(420) from the curve (410) increases, so does the penalty assignment of points to the recommended task. Each contour further deviating from the curve (410) represents system responses that further deviate from an expected system response.

Conversely, tasks that fall above the curve (410) and within a range of one or more of the contours representing over-performance of the system in response to actions associated with the recommendation(s). A numerical reward is assigned to a task that falls within the range represented by the contours. In this example, there are five contours (430), (432), (434), (436), and (438) that fall above the curve (410). As the distance of the contours (430)-(438) from curve (410) increases, the reward decreases. Each contour further away from the curve (410) represents system responses that further deviate from an expected system response. As the actual outcome approaches the curve (410), the reward proportionally reflects the closeness of the results of the recommended task to the curve (410). There are many reward and penalty functions that may be applied to the tool at hand. Regardless of the function employed, the underlying premise is to assign rewards and penalties in a manner that reflects desired system performance.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual processing of the program code, bulk storage, and cache memories which provide temporary storage of at least some program code in order to reduce the number of times code must be retrieved from bulk storage during processing.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening networks.

The software implementation can take the form of a computer program product accessible from a computer-useable or computer-readable medium providing program code for use by or in connection with a computer or any instruction processing system.

Advantages Over the Prior Art

The recommendation framework employs a feedback system that may be applied to future system recommendations to improve system performance. Recommendations are based on a combination of a model with an associated predicted outcome, and/or feedback received from a system administrator. The model prediction is based upon fixing or preventing a problem, improving performance, reducing risk, and a time range for the prediction. Each recommendation has an associated cost for implementation. The system administrator may provide explicit feedback data that is employed for one or more future recommendations.

Alternative Embodiments

It will be appreciated that, although specific embodiments of the invention have been described herein for purposes of illustration, various modifications may be made without departing from the spirit and scope of the invention. In particular, the feedback system is not limited to an information technology system. Rather, the feedback system may be employed with any computer system. Similarly, as shown herein, feedback may be solicited from the system administrator. Such feedback is not limited to strict positive or negative feedback. In one embodiment, the feedback from the system administrator may be explicit feedback in the form of nuanced feedback, including permitting the system administrator to share their thoughts on a granular level and/or provide alternative tasks recommendations that may differ from the automated recommendations. Accordingly, the scope of protection of this invention is limited only by the following claims and their equivalents.

We claim:

1. A method for managing system performance, comprising:
   providing a processor in communication with memory;
   dynamically recommending, by the processor, a set of tasks having at least one task recommendation for management of at least one computer system component, wherein the recommendation is based on a predicted impact on the computer system;
   responding to a selection of a task recommendation from the set, including producing explicit feedback data;
   tracking an impact of the selected task recommendation on computer system parameters, and obtaining implicit feedback data based on the impact;
   categorizing accumulated implicit and explicit feedback data;
   determining a variance of the categorized feedback and averaging the categorized feedback with prior categorized feedback data responsive to the determined variance; and
   generating at least one future task recommendation based on the averaged feedback data.

2. The method of claim 1, wherein the explicit feedback is nuanced feedback.

3. The method of claim 1, wherein the impact of the selected task recommendation is associated with a graph, the graph representing predicted impact values and measured impact values, and applying a contoured response function to the measured impact of the selected task recommendation, including:
   determining a distance between a curve modeling the values and a contour; and
   assigning a response based upon the determined distance.

4. The method of claim 1, further comprising continuously monitoring a state of the system and creating a task recommendation for system performance based upon the state of the system.

5. The method of claim 1, wherein generating the set of future task recommendations comprises adjusting the set of task recommendations based on the averaged feedback data.

6. The method of claim 3, wherein a distance below the curve is associated with task underperformance and a distance above the curve is associated with task overperformance, and wherein a reward value decreases from a maximum reward value in an amount proportional to the determined distance.

7. A computer system, comprising:
   a processor in communication with memory;
   an interface in communication with the processor, the interface to:
     present a recommendation of a set of tasks having at least one task recommendation for management of at least one system component, wherein the recommendation is based on a predicted impact on the system; and
     receive a response to the at least one recommended task, including receiving a selection of a task recommendation from the set, wherein the selection of the task recommendation produces explicit feedback data;
   an analysis manager in communication with the processor, the analysis manager to:
     track a measured impact of the selected task recommendation on system parameters, and obtain implicit feedback data based on the measured impact; and accumulate the implicit and explicit feedback, and categorize the accumulated feedback data; and a recommendation manager in communication with the processor, the recommendation manager to:

determine a variance of the categorized feedback and average the categorized feedback with prior categorized feedback data in response to the determined variance; and generate a set of future task recommendations comprising at least one future task recommendation based on the averaged feedback data.

8. The system of claim 7, wherein the explicit feedback is nuanced feedback.

9. The system of claim 7, wherein the impact of the selected task recommendation is associated with a graph, the graph representing predicted impact values and measured impact values, and the analysis manager to apply a contoured response function to the measured impact of the selected task recommendation, including the analysis manager to:

determine a distance between a curve modeling the values and a contour; and assign a response based upon the determined distance.

10. The system of claim 7, further comprising the analysis manager to continuously monitor a state of the system and create a task recommendation for system performance based upon the state of the system.

11. The system of claim 7, wherein generating the set of future task recommendations comprises the recommendation manager to adjust the set of task recommendations based on the average feedback data.

12. The system of claim 9, wherein a distance below the curve is associated with task underperformance and a distance above the curve is associated with task overperformance, and wherein the reward value decreases from a maximum reward value in an amount proportional to the determined distance.

13. An article comprising:

a computer-readable data-storage device including computer program instructions configured to manage system performance, the instructions executable by a processor to:

dynamically recommend a set of tasks having at least one task recommendation for management of at least one computer system component, wherein the recommendation is based on a predicted impact on the computer system;

respond to a selection of a task recommendation from the set by a system administrator, including instructions to produce explicit feedback;

track an impact of the selected task recommendation on computer system parameters, and obtain implicit feedback based on the impact;

categorize accumulated implicit and explicit feedback;

determine a variance of the categorized feedback, average the categorized feedback with prior categorized feedback data; and generate at least one future task recommendation based on the averaged feedback data.

14. The article of claim 13, wherein the explicit feedback is nuanced feedback.

15. The article of claim 13, wherein the impact of the selected task recommendation is associated with a graph, the graph representing predicted impact values and measured impact values, and apply a contoured response function to the measured impact of the selected task recommendation, including instructions to:

determine a distance between a curve modeling the values and a contour; and assign a response based upon the determined distance.

16. The article of claim 13, further comprising instructions to continuously monitor a state of the system and create a task recommendation for system performance based upon the state of the system.

17. The article of claim 13, wherein generating the set of future task recommendations comprises instructions to adjust the set of task recommendations based on the average feedback data.

18. The article of claim 15, wherein a distance below the curve is associated with task underperformance and a distance above the curve is associated with task overperformance, and wherein the reward value decreases from the maximum reward value in an amount proportional to the determined distance.

* * * * *